Patented Aug. 10, 1926.

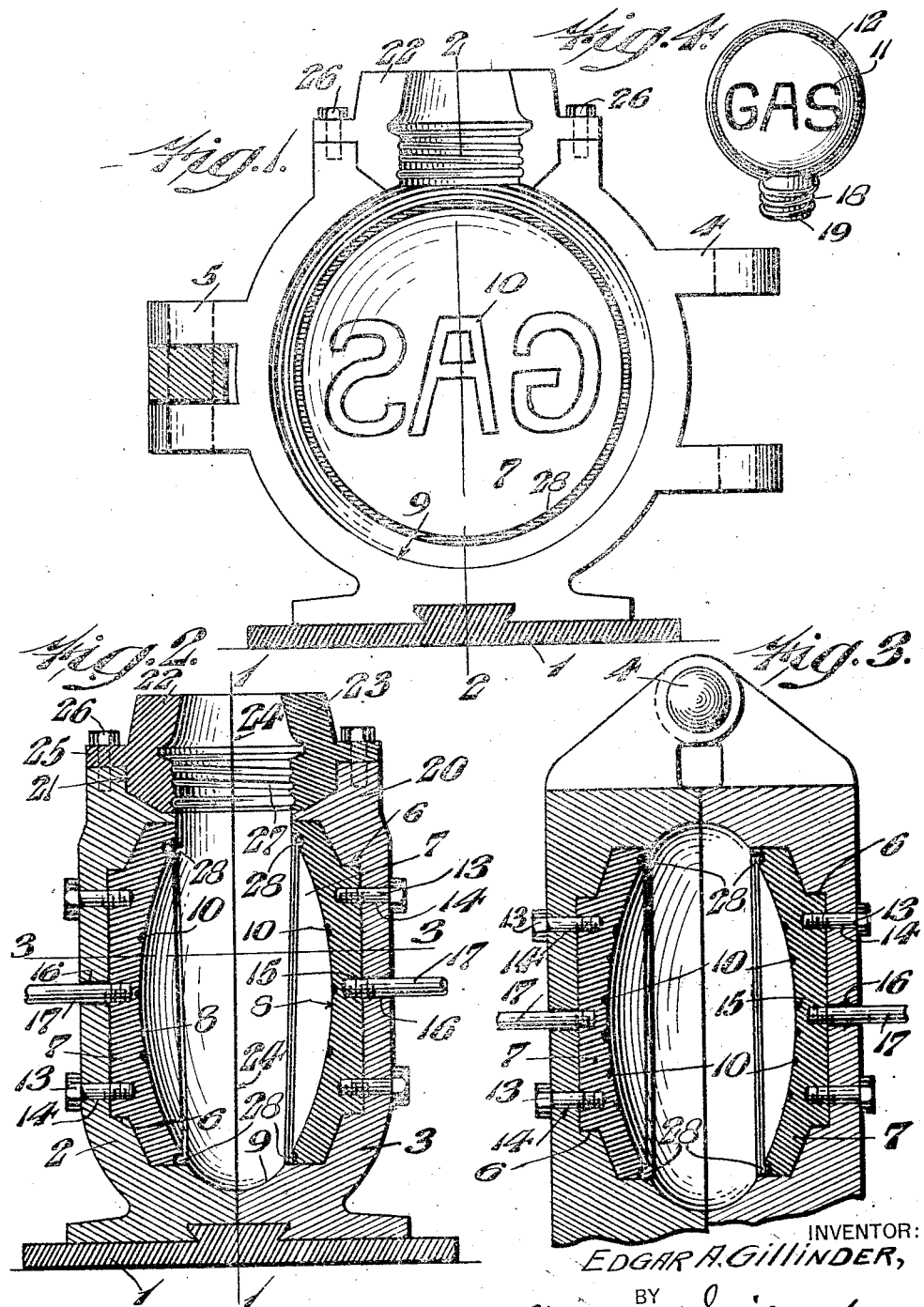

1,595,773

UNITED STATES PATENT OFFICE.

EDGAR A. GILLINDER, OF PHILADELPHIA, PENNSYLVANIA, ASSIGNOR TO GILLINDER & SONS, INC., OF PHILADELPHIA, PENNSYLVANIA, A CORPORATION OF PENNSYLVANIA.

GLASS MOLD.

Application filed May 1, 1926. Serial No. 105,939.

My invention relates to a new and useful glass mold for molding glass globes and the like, and it relates more particularly to a new and useful mold of the character stated, for molding the oval or canteen shaped discs or globes for gasoline service stations, having suitable lettering embossed thereon and adapted to be threadedly secured and supported upon a base, and adapted to be illuminated from within.

My invention further relates to a new and useful mold of the character stated, wherein the lettering or indicia or other configuration, as well as the character of the thread on the neck of the globe, may be quickly altered, by merely interchanging or substituting novel removable face die plates and thread molding die members, which are detachably secured to the body of the mold.

With the above ends in view, my invention consists of a mold of the character stated, having the bottom plate of the usual character, and a pair of hinged mold members mounted upon said bottom plate and adapted to be locked so as to form a closed mold; each of the hinged halves of said mold having a suitable inner circular recess or socket in the inner face thereof, adapted to receive corresponding embossed face die plates, means to align and secure said embossed face die plates in said recess or socket, the inner or molding surfaces of said die plates forming an uninterrupted continuation of the inner molding surfaces of said mold halves, and a pair of thread mold die members having suitable thread molding inner surfaces, detachably secured to the neck portion of the mold halves, so as to form a continuation of the body of the mold, and thereby to mold a threaded neck on the body of the globe.

In my novel construction in molds for glass globes, and particularly for the canteen shaped globes for gasoline service stations, a mold is provided in which any number of different styles of globes may be molded, by the mere change of certain die molding elements or members. Thus, by interchanging the thread molding die members, in the neck of the mold, a globe may be molded having any suitable form of thread on the portion thereof, thereby to adapt the same to any threaded receiving or supporting member. This obviates the necessity of providing a complete mold for every different thread on the neck of the globe. Moreover, by this novel construction, a quick interchange of molding elements or members is made possible.

For the purpose of illustrating my invention, I have shown in the accompanying drawings, forms thereof which are at present preferred by me, since they will give in practice satisfactory and reliable results, although it is to be understood that the various instrumentalities of which my invention consists can be variously arranged and organized and that my invention is not limited to the precise arrangement and organization of these instrumentalities as herein shown and described.

Referring to the drawings:—

Figure 1 represents a vertical section of a mold, along the parting line, embodying my invention.

Figure 2 represents a section on line 2—2 of Figure 1.

Figure 3 represents a section on line 3—3 of Figure 2.

Figure 4 represents a perspective view, on a greatly reduced scale, of a canteen globe for gasoline service stations, formed by my novel mold.

Referring to the drawings, in which like reference characters indicate like parts, 1 designates the bottom plate of the mold, of the usual construction, having mounted thereon a pair of similar halves 2 and 3, of the mold, hingedly secured to each other by the vertical hinge 4, and having any suitable locking means 5, at their opposed edges, for locking the two halves in the closed position, shown in Figures 2 and 3. Each of the halves 2 and 3 is provided with a circular inner recess or socket 6, in which are seated corresponding opposed die plates 7, the peripheries of which fit snugly within the recesses or sockets 6.

The inner molding surfaces 8, of the die plates 7 are suitably concaved and aligned, to form a continuation of the molding surfaces 9 of the body of the mold members 2 and 3, and are provided with indented lettering, indicia or other configuration 10, to produce the raised or embossed lettering indicia or configuration 11, on the completed globe 12, as shown in Figure 4. A series of bolts 13, extending through suitable apertures 14 in the walls of the two halves 2 and 3, are threaded into the die plates 7, as indicated in Figures 2 and 3, thereby rigidly to secure the plates in the mold.

In order to aid in the positioning and removing of the die plates 7, for the purposes of interchanging the same, a central threaded opening 15 may also be provided in each of the die plates 7, and a corresponding aligned opening 16 in the walls of the mold members 2 and 3, whereby a suitable threaded mounting rod 17 may be inserted through the opening 16 and threadedly attached to the die plates 7, thereby to support and guide the same into the recesses 6. The interchange of die plates is greatly facilitated by this means.

In order to produce an outwardly projecting or raised screw thread 18, upon the neck 19, of the canteen globe 12, the neck portion 20 of the mold is provided with a suitably enlarged recess 21, in which are snugly seated the two semicircular halves or members 22 and 23, of a thread molding die, also parted along the line 24. Each of the thread die members 22 and 23, are provided with laterally projecting flanges 25, overhanging the upper edges of the neck 20 of the mold, whereby said die members may be rigidly secured to the two halves 22 and 23 of the mold, by means of the bolts 26. The thread 27 of the thread die 22 and 23, may be of any suitable pitch and contour.

A circular channel or groove 28, preferably of semicircular cross section, is provided in each of the die plates 7, whereby an outwardly projecting reinforcing bead 29 is produced on each of the opposed face panels of the globe.

By this novel construction in a globe mold, a relatively large canteen globe may be produced for gasoline service stations having relatively large opposed convex face panels, with any desired inscriptions or other configurations embossed thereon, surrounded by a reinforcing bead, and having a suitably threaded neck portion 19, whereby the globe may be mounted and supported in a stand, without any screws bearing directly against the glass, but whereby the globe may be supported in a suitable threaded metallic socket or collar. Moreover, by my novel construction in a mold of this character, the inscriptions on the opposed convex face panels of the globe, as well as the thread on the neck of the globe, may readily be changed, thereby permitting the use of the same mold for a large number of different globes.

It will now be apparent that I have devised a novel and useful construction of glass molds, which embodies the features of advantage enumerated as desirable in the statement of the invention and the above description, and while I have in the present instance shown and described a preferred embodiment of my invention which will give in practice satisfactory and reliable results, it is to be understood that such embodiment is susceptible of modification and variation in various particulars without departing from the spirit or scope of the invention or sacrificing any of its advantages.

Having thus described my invention, what I claim as new and desire to secure by Letters Patent is:—

1. In a mold of the character stated, a bottom plate, a pair of hinged mold members, having body molding portions and upper neck molding portions, and having opposed inner recesses in the inner surfaces of the body portions thereof, a pair of opposed die plates having opposed inner concaved die surfaces seated in said recesses, means for securing said die plates in said recesses, and a pair of semicircular upper thread dies detachably secured to the neck portion of said mold members.

2. In a mold of the character stated, a bottom plate, a pair of mold members having body molding portions and upper neck molding portions and having opposed inner recesses in the body portions thereof, a pair of opposed die plates having opposed concaved surfaces seated in said recesses, means for securing said die plates in said recesses, a pair of semicircular upper thread dies seated in the neck portion of said mold members, laterally projecting flanges carried by said thread dies, overhanging the upper edge of the neck portion of said mold members and means detachably to secure said flanges to said upper edges.

EDGAR A GILLINDER.